United States Patent
Curtis

(10) Patent No.: US 8,621,099 B2
(45) Date of Patent: Dec. 31, 2013

(54) SYSTEMS AND METHODS FOR FORMATTING MEDIA CONTENT FOR DISTRIBUTION

(75) Inventor: Sean Curtis, Rockville Center, NY (US)

(73) Assignee: Sling Media, Inc., Foster City, CA (US)

( * ) Notice: Subject to any disclaimer, the term of this patent is extended or adjusted under 35 U.S.C. 154(b) by 809 days.

(21) Appl. No.: 12/635,138

(22) Filed: Dec. 10, 2009

(65) Prior Publication Data

US 2011/0072073 A1 Mar. 24, 2011

Related U.S. Application Data

(60) Provisional application No. 61/244,360, filed on Sep. 21, 2009.

(51) Int. Cl.
*G06F 15/16* (2006.01)

(52) U.S. Cl.
USPC ........... 709/231; 709/203; 709/224; 709/232; 709/200

(58) Field of Classification Search
USPC ................. 709/203, 224, 231, 232
See application file for complete search history.

(56) References Cited

U.S. PATENT DOCUMENTS

| | | |
|---|---|---|
| 5,237,648 A | 8/1993 | Mills et al. |
| 5,434,678 A | 7/1995 | Abecassis |
| 5,438,423 A | 8/1995 | Lynch et al. |
| 5,610,653 A | 3/1997 | Abecassis |
| 5,684,918 A | 11/1997 | Abecassis |
| 5,696,869 A | 12/1997 | Abecassis |
| 5,892,536 A | 4/1999 | Logan et al. |
| 5,953,485 A | 9/1999 | Abecassis |
| 6,036,601 A | 3/2000 | Heckel |
| 6,088,455 A | 7/2000 | Logan et al. |
| 6,091,886 A | 7/2000 | Abecassis |
| 6,151,444 A | 11/2000 | Abecassis |
| 6,208,805 B1 | 3/2001 | Abecassis |
| 6,389,467 B1 | 5/2002 | Eyal |
| 6,408,128 B1 | 6/2002 | Abecassis |
| 6,421,429 B1 * | 7/2002 | Merritt et al. .............. 379/93.17 |
| 6,476,826 B1 | 11/2002 | Plotkin et al. |
| 6,505,169 B1 | 1/2003 | Bhagavath et al. |
| 6,529,506 B1 | 3/2003 | Yamamoto et al. |
| 6,553,178 B2 | 4/2003 | Abecassis |

(Continued)

FOREIGN PATENT DOCUMENTS

| | | |
|---|---|---|
| EP | 2071839 A1 | 6/2009 |
| TW | 200703018 A | 1/2007 |
| WO | 0147248 A2 | 6/2001 |
| WO | 2007096001 A1 | 8/2007 |

OTHER PUBLICATIONS

USPTO "Final Office Action" mailed Apr. 27, 2012; U.S. Appl. No. 12/347,465, filed Dec. 31, 2008.

(Continued)

*Primary Examiner* — Anthony Mejia
(74) *Attorney, Agent, or Firm* — Ingrassia Fisher & Lorenz, P.C.

(57) ABSTRACT

Systems and methods are described for processing media programs for distribution on a network. Media programs are received from one or more sources and placed on a queue in an appropriate format. Programs are retrieved from the queue and processed by any number of servers to format the program and/or its metadata for distribution on the network.

15 Claims, 3 Drawing Sheets

(56) References Cited

U.S. PATENT DOCUMENTS

| | | |
|---|---|---|
| 6,597,375 B1 | 7/2003 | Yawitz |
| 6,609,253 B1 | 8/2003 | Swix et al. |
| 6,795,638 B1 | 9/2004 | Skelley, Jr. |
| 6,931,451 B1 | 8/2005 | Logan et al. |
| 6,941,575 B2 | 9/2005 | Allen |
| 7,032,000 B2 | 4/2006 | Tripp |
| 7,055,166 B1 | 5/2006 | Logan et al. |
| 7,058,376 B2 | 6/2006 | Logan et al. |
| 7,124,366 B2 | 10/2006 | Foreman et al. |
| 7,127,507 B1* | 10/2006 | Clark et al. ............... 709/224 |
| 7,155,735 B1 | 12/2006 | Ngo et al. |
| 7,239,800 B2 | 7/2007 | Bilbrey |
| 7,430,360 B2 | 9/2008 | Abecassis |
| 7,478,164 B1* | 1/2009 | Lango et al. ............... 709/231 |
| 7,478,166 B2* | 1/2009 | Agnoli et al. ............... 709/231 |
| 7,516,136 B2* | 4/2009 | Lee et al. ............................. 1/1 |
| 7,549,160 B1 | 6/2009 | Podar et al. |
| 7,558,862 B1 | 7/2009 | Tyukasz et al. |
| 7,565,681 B2 | 7/2009 | Ngo et al. |
| 7,594,218 B1* | 9/2009 | Lozben ........................... 717/120 |
| 7,661,121 B2 | 2/2010 | Smith et al. |
| 7,676,590 B2* | 3/2010 | Silverman et al. ............. 709/231 |
| 7,720,432 B1 | 5/2010 | Colby et al. |
| 7,721,300 B2* | 5/2010 | Tipton et al. ................... 719/321 |
| 7,721,315 B2 | 5/2010 | Brown et al. |
| 7,895,275 B1* | 2/2011 | Evans et al. ................... 709/206 |
| 7,921,150 B1* | 4/2011 | Schwartz ........................ 709/201 |
| 7,945,688 B1* | 5/2011 | Lango et al. ................... 709/231 |
| 7,975,047 B2 | 7/2011 | Dongre |
| 8,082,545 B2* | 12/2011 | Prakash ........................... 718/104 |
| 8,171,148 B2 | 5/2012 | Lucas et al. |
| 8,194,681 B2* | 6/2012 | Kaarela et al. .................. 370/401 |
| 2002/0004839 A1 | 1/2002 | Wine et al. |
| 2002/0031333 A1 | 3/2002 | Mano et al. |
| 2002/0105529 A1 | 8/2002 | Bowser et al. |
| 2002/0120925 A1 | 8/2002 | Logan |
| 2002/0138843 A1 | 9/2002 | Samaan et al. |
| 2002/0143972 A1* | 10/2002 | Christopoulos et al. ....... 709/231 |
| 2002/0151992 A1 | 10/2002 | Hoffberg et al. |
| 2003/0074660 A1 | 4/2003 | McCormack et al. |
| 2003/0078973 A1 | 4/2003 | Przekop et al. |
| 2003/0088686 A1 | 5/2003 | Jennings |
| 2003/0093260 A1 | 5/2003 | Dagtas et al. |
| 2003/0093790 A1 | 5/2003 | Logan et al. |
| 2003/0187657 A1 | 10/2003 | Erhart et al. |
| 2003/0192054 A1 | 10/2003 | Birks et al. |
| 2003/0198243 A1 | 10/2003 | Yamada |
| 2003/0208612 A1 | 11/2003 | Harris et al. |
| 2003/0231868 A1 | 12/2003 | Herley |
| 2003/0234803 A1 | 12/2003 | Toyama et al. |
| 2004/0003406 A1 | 1/2004 | Billmaier |
| 2004/0101271 A1 | 5/2004 | Boston et al. |
| 2004/0139047 A1 | 7/2004 | Rechsteiner et al. |
| 2004/0162845 A1 | 8/2004 | Kim et al. |
| 2004/0177151 A1 | 9/2004 | Kryeziu |
| 2004/0194141 A1 | 9/2004 | Sanders |
| 2004/0205830 A1 | 10/2004 | Kaneko |
| 2004/0216173 A1 | 10/2004 | Horoszowski et al. |
| 2004/0221029 A1 | 11/2004 | Jenkins et al. |
| 2004/0236844 A1 | 11/2004 | Kocherlakota |
| 2004/0255330 A1 | 12/2004 | Logan |
| 2004/0255334 A1 | 12/2004 | Logan |
| 2004/0255336 A1 | 12/2004 | Logan et al. |
| 2005/0005308 A1 | 1/2005 | Logan et al. |
| 2005/0021398 A1 | 1/2005 | McCleskey et al. |
| 2005/0027821 A1 | 2/2005 | Alexander et al. |
| 2005/0053356 A1 | 3/2005 | Mate et al. |
| 2005/0155077 A1 | 7/2005 | Lawrence et al. |
| 2005/0204046 A1 | 9/2005 | Watanabe |
| 2005/0216851 A1 | 9/2005 | Hull et al. |
| 2005/0262539 A1 | 11/2005 | Barton et al. |
| 2005/0288999 A1 | 12/2005 | Lerner et al. |
| 2006/0015925 A1 | 1/2006 | Logan |
| 2006/0031381 A1 | 2/2006 | Van Luijt et al. |
| 2006/0095401 A1* | 5/2006 | Krikorian et al. ................ 707/1 |
| 2006/0095471 A1 | 5/2006 | Krikorian et al. |
| 2006/0095472 A1 | 5/2006 | Krikorian et al. |
| 2006/0171395 A1* | 8/2006 | Deshpande ..................... 370/393 |
| 2006/0190616 A1* | 8/2006 | Mayerhofer et al. .......... 709/231 |
| 2006/0206526 A1* | 9/2006 | Sitomer ....................... 707/104.1 |
| 2006/0230345 A1* | 10/2006 | Weng et al. .................... 715/523 |
| 2006/0280177 A1* | 12/2006 | Gupta et al. .................... 370/389 |
| 2006/0280437 A1 | 12/2006 | Logan et al. |
| 2006/0294183 A1* | 12/2006 | Agnoli et al. .................. 709/203 |
| 2007/0019545 A1 | 1/2007 | Alt et al. |
| 2007/0043792 A1* | 2/2007 | O'Brien ......................... 707/205 |
| 2007/0067390 A1* | 3/2007 | Agnoli et al. .................. 709/204 |
| 2007/0073767 A1* | 3/2007 | Springer et al. ........... 707/103 R |
| 2007/0074115 A1 | 3/2007 | Patten et al. |
| 2007/0113250 A1 | 5/2007 | Logan et al. |
| 2007/0136778 A1* | 6/2007 | Birger et al. .................... 725/117 |
| 2007/0147263 A1 | 6/2007 | Liao et al. |
| 2007/0157237 A1 | 7/2007 | Cordray et al. |
| 2007/0168543 A1 | 7/2007 | Krikorian et al. |
| 2007/0183436 A1 | 8/2007 | Hunter |
| 2007/0198532 A1 | 8/2007 | Krikorian et al. |
| 2007/0217407 A1 | 9/2007 | Yuan et al. |
| 2007/0234213 A1 | 10/2007 | Krikorian et al. |
| 2007/0288550 A1 | 12/2007 | Ise et al. |
| 2007/0300258 A1 | 12/2007 | O'Connor et al. |
| 2008/0007651 A1* | 1/2008 | Bennett ........................... 348/443 |
| 2008/0036917 A1 | 2/2008 | Pascarella et al. |
| 2008/0059533 A1 | 3/2008 | Krikorian |
| 2008/0060035 A1 | 3/2008 | Tsang et al. |
| 2008/0195698 A1* | 8/2008 | Stefanovic et al. ............ 709/203 |
| 2008/0199150 A1 | 8/2008 | Candelore |
| 2008/0215392 A1* | 9/2008 | Rajan ................................... 705/7 |
| 2008/0229404 A1 | 9/2008 | Siegrist et al. |
| 2008/0301233 A1 | 12/2008 | Choi |
| 2009/0074380 A1 | 3/2009 | Boston et al. |
| 2009/0103607 A1* | 4/2009 | Bajpai et al. ............. 375/240.02 |
| 2009/0133088 A1 | 5/2009 | Kim et al. |
| 2009/0157697 A1 | 6/2009 | Conway et al. |
| 2009/0157777 A1* | 6/2009 | Golwalkar et al. ............ 707/205 |
| 2009/0199248 A1 | 8/2009 | Ngo et al. |
| 2009/0254672 A1* | 10/2009 | Zhang ............................ 709/231 |
| 2009/0268740 A1* | 10/2009 | Sindhu et al. ................. 370/392 |
| 2009/0282445 A1 | 11/2009 | Yang et al. |
| 2010/0005483 A1 | 1/2010 | Rao |
| 2010/0023642 A1* | 1/2010 | Ladd et al. .................... 709/231 |
| 2010/0030880 A1 | 2/2010 | Joshi et al. |
| 2010/0046513 A1 | 2/2010 | Park et al. |
| 2010/0070925 A1 | 3/2010 | Einaudi et al. |
| 2010/0100898 A1 | 4/2010 | Pfleging et al. |
| 2010/0169477 A1* | 7/2010 | Stienhans et al. .............. 709/224 |
| 2010/0226444 A1* | 9/2010 | Thevathasan et al. ... 375/240.29 |
| 2010/0269144 A1* | 10/2010 | Forsman et al. ................. 725/92 |
| 2010/0281042 A1* | 11/2010 | Windes et al. ................. 707/756 |
| 2010/0309916 A1* | 12/2010 | Oskouy et al. ................. 370/392 |
| 2010/0333162 A1 | 12/2010 | Lloyd et al. |
| 2011/0002381 A1 | 1/2011 | Yang et al. ............... 375/240.03 |
| 2011/0047079 A1* | 2/2011 | Du et al. .......................... 705/57 |
| 2011/0050908 A1* | 3/2011 | Nam ............................... 348/192 |
| 2011/0125861 A1* | 5/2011 | Evans et al. .................... 709/206 |
| 2011/0307608 A1* | 12/2011 | Chang et al. ................... 709/224 |
| 2012/0039580 A1 | 2/2012 | Sweatt, III et al. |
| 2012/0166669 A1* | 6/2012 | Price .............................. 709/231 |
| 2012/0219001 A1* | 8/2012 | Sindhu et al. ................. 370/392 |

OTHER PUBLICATIONS

USPTO "Non-Final Office Action" mailed Apr. 27, 2012; U.S. Appl. No. 12/821,983, filed Jun. 23, 2010.

Taiwan Intellectual Property Office "Office Action" mailed Feb. 23, 2012 for Taiwan Application 097137393.

USPTO Non-Final Office Action mailed Mar. 31, 2010; U.S. Appl. No. 11/620,707, filed Jan. 7, 2007.

Liu, Qiong et al. "digital Rights Management for Content Distribution," Proceedings of the Australiasian Information Se3curity Workshop Conference on ACSW Frontiers 2003, vol. 21, 2003, XP002571073, Adelaide, Australia, ISSN: 1445-1336, ISBN: 1-920682-00-7, sections 2 and 2.1.1.

USPTO "Non-Final Office Action" mailed Mar. 21, 2011; U.S. Appl. No. 12/426,103, filed Apr. 17, 2009.

(56) References Cited

OTHER PUBLICATIONS

European Patent Office, International Searching Authority, "International Search Report" mailed Mar. 18, 2011; International Appln. No. PCT/US2010/060797, filed Dec. 16, 2010.
European Patent Office "EPO Communication" dated Nov. 29, 2010; Application No. 08 167 880.7-2202.
USPTO "Non-Final Office Action" mailed Jan. 10, 2012; U.S. Appl. No. 12/827,964, filed Jun. 30, 2010.
Chinese Office Action, dated Dec. 31, 2011, for Chinese Patent Application No. 200810161874.X.
USPTO "Notice of Allowance" mailed Jan. 10, 2012; U.S. Appl. No. 12/426,103, filed Apr. 17, 2009.
USPTO, Non-Final Office Action mailed May 15, 2009; U.S. Appl. No. 11/147,664, filed Jun. 7, 2005.
USPTO, Final Office Action mailed Dec. 30, 2009; U.S. Appl. No. 11/147,664, filed Jun. 7, 2005.
USPTO, Non-Final Office Action mailed Jun. 26, 2008; U.S. Appl. No. 11/620,707, filed Jan. 7, 2007.
USPTO, Final Office Action mailed Oct. 21, 2008; U.S. Appl. No. 11/620,707, filed Jan. 7, 2007.
USPTO, Non-Final Office Action mailed Mar. 25, 2009; U.S. Appl. No. 11/620,707, filed Jan. 7, 2007.
USPTO, Final Office Action mailed Nov. 12, 2009; U.S. Appl. No. 11/620,707, filed Jan. 7, 2007.
USPTO, Non-Final Office Action mailed Aug. 7, 2008; U.S. Appl. No. 11/620,711, filed Jan. 7, 2007.
USPTO, Final Office Action mailed Feb. 9, 2009; U.S. Appl. No. 11/620,711, filed Jan. 7, 2007.
USPTO, Non-Final Office Action mailed Sep. 3, 2009; U.S. Appl. No. 11/620,711, filed Jan. 7, 2007.
USPTO, Non-Final Office Action mailed Feb. 25, 2009; U.S. Appl. No. 11/683,862, filed Mar. 8, 2007.
USPTO, Non-Final Office Action mailed Nov. 23, 2009; U.S. Appl. No. 11/683,862, filed Mar. 8, 2007.
USPTO, Non-Final Office Action mailed Jul. 31, 2009; U.S. Appl. No. 11/683,862, filed Mar. 8, 2007.
The Authoritative Dictionary of IEEE Standard Terms, 7th ed. 2000.
Newton's Telcom Dictionary, 20th ed., Mar. 2004.
Newton's Telcom Dictionary, 21st ed., Mar. 2005.
Sonic Blue "ReplayTV 5000 User's Guide," 2002, entire document.
Meyer, Derrick "MyReplayTV™ Creates First-Ever Online Portal to Personal TI! Service; Gives Viewers Whole New Way to Interact With Programming," http://web.archive.org/web/20000815052751/http://www.myreplaytv.com/, Aug. 15, 2000.
USPTO Non-Final Office Action mailed Mar. 19, 2010; U.S. Appl. No. 11/147,664, filed Jun. 7, 2005.
USPTO Final Office Action mailed Mar. 12, 2010; U.S. Appl. No. 11/620,711, filed Jan. 7, 2007.
USPTO Non-Final Office Action mailed Jun. 23, 2010; U.S. Appl. No. 11/933,969, filed Nov. 1, 2007.
USPTO "Non-Final Office Action" mailed Jun. 27, 2012 for U.S. Appl. No. 13/458,852, filed Apr. 27, 2012.
USPTO "Final Office Action" mailed Aug. 7, 2012 for U.S. Appl. No. 12/821,983, filed Jun. 23, 2010.
USPTO "Non-Final Office Action" mailed Jul. 19, 2012 for U.S. Appl. No. 12/619,192, filed Nov. 16, 2009.
USPTO "Non-Final Office Action" mailed Sep. 6, 2011; U.S. Appl. No. 12/347,465, filed Dec. 31, 2008.
USPTO "Notice of Allowance" mailed Sep. 22, 2011; U.S. Appl. No. 12/979,145, filed Dec. 27, 2010.
USPTO "Final Office Action" mailed Oct. 17, 2011; U.S. Appl. No. 12/426,103, filed Apr. 17, 2009.
USPTO Final Office Action mailed Sep. 24, 2010; U.S. Appl. No. 11/620,707, filed Jan. 7, 2007.
Carlson, T. "Mule 2.x Getting Started Guide," Apr. 15, 2008, 134 pages.
USPTO "Non-Final Office Action" mailed Oct. 12, 2012 for U.S. Appl. No. 12/645,870, filed Dec. 23, 2009.
China Patent Office "Office Action" issued Aug. 3, 2012 for Chinese Patent Appln. No. 200810161874.X.
USPTO "Notice of Allowance" mailed Aug. 31, 2012 for U.S. Appl. No. 11/620,711, filed Jan. 7, 2007.
USPTO "Final Office Action" mailed Jun. 6, 2012 for U.S. Appl. No. 12/827,964, filed Jun. 30, 2010.
Intellectual Property Office "Office Action" dated Feb. 25, 2013 for Taiwan Patent Appln. No. 098146025.
USPTO "Non-Final Office Action" dated Mar. 5, 2013 for U.S. Appl. No. 13/107,341.
China State Intellectual Property Office "Fourth Office Action" dated Mar. 5, 2013 for Chinese Patent Appln. No. 20081016874.X.
USPTO "Non-Final Office Action" dated Feb. 25, 2013 for U.S. Appl. No. 13/458,852.
Intellectual Property Office of Singapore "Search Report and Written Opinion" dated Nov. 8, 2012 for Singapore Appln. No. 201107539-7.
USPTO "Final Office Action" mailed Feb. 21, 2013 for U.S. Appl. No. 12/619,192, filed Nov. 16, 2009.
USPTO "Non-Final Office Action" mailed Dec. 21, 2012 for U.S. Appl. No. 12/648,024, filed Dec. 28, 2009.
USPTO "Non-Final Office Action" mailed Feb. 5, 2013 for U.S. Appl. No. 13/098,192, filed Apr. 29, 2011.
Japan Patent Office "Notice of Rejection Ground" dated Mar. 26, 2013 for Japanese Patent Appln. No. 2012-506055.
Canadian Intellectual Property Office, "Office Action" mailed May 17, 2013 for Canadian Patent Application No. 2,758,791.
Intellectual Property Office of Singapore, "Search Report and Written Opinion," mailed May 30, 2013 for Singapore Patent Application No. 201204603-3.
Intellectual Property Office, "Office Action" mailed Apr. 26, 2013 for Taiwan Patent Application No. 099111307.

* cited by examiner

SYSTEMS AND METHODS FOR FORMATTING MEDIA CONTENT FOR DISTRIBUTION

PRIORITY

This application claims priority to U.S. Provisional Patent Application Ser. No. 61/244,360 filed on Sep. 21, 2009, which is incorporated herein by reference in its entirety.

TECHNICAL FIELD

This document generally relates to processing of digital media, and particularly relates to systems and techniques for automating the processes for distributing media programs on a network.

BACKGROUND

An online media distribution service typically distributes media programming to viewers over the Internet or a similar network. Media programs distributed by such services may include television programs, movies, other audio/visual content, audio content and/or the like that are obtained from one or more sources. Typically, viewers can connect to the online distribution service using a conventional web browser or other client program to obtain streaming or file-based programming as desired.

Media distribution services often receive their distributed content from any number of different production sources, syndicators, web-based services and/or other media sources as appropriate. Providing content from multiple sources, however, can create a number of challenges. Often, each content source has its own set of techniques and formats for delivering new material. Media files may be delivered, for example, using any number of different transport techniques and channels. Moreover, files may be received in any number of different compressed and/or uncompressed formats that may be transcoded or otherwise converted before the content is made available for distribution to viewers. Further, as viewers use an increasing variety of client devices (e.g., mobile phones, video game players, and other portable devices), it may be desirable to encode/transcode received content into any number of different distribution formats (e.g., different formats, and/or other files of different sizes, bit rates, frame rates, resolutions and/or other parameters) to accommodate a variety of viewers and viewing devices. Hence, the types and amounts of transcoding or other processing that may be performed on the received content prior to distribution can be significant.

Moreover, many different content providers have unique formats for the metadata that describes the media content itself. Most websites provide at least some description of the content that is distributed: this description may include the name of the program, names of actors/actresses, a brief description of the programming, any ratings or parental control information, and/or any other information as desired. This "metadata" information about the programming content may be provided by the content provider with the media content itself, or it may be retrieved from any other source. In either case, formatting of the metadata can be a significant challenge due to the wide variety of formats that may be used by any number of different data sources.

Content distributors therefore frequently encounter any number of challenges in converting received programming into formats that are suitable for distribution to customers. Typically, the large volume of content received, the relative frequency of content delivery and the desire to make content available as quickly as possible makes manual processing of received programming impractical, or at least undesirable in many implementations.

It is therefore desirable to create systems, methods and/or devices that automate at least some of the process for encoding media programs from any number of sources and/or for processing the metadata associated with such sources. These and other desirable features and characteristics will become apparent from the subsequent detailed description and the appended claims, taken in conjunction with the accompanying drawings and this background section.

BRIEF SUMMARY

Systems and methods are described to process media programs for distribution on a network. In various embodiments, a system to process a plurality of media programs suitably comprises a queue, a number of servers, and control logic. The queue is configured to receive each of the plurality of media programs in a predetermined format. Each of the number of servers is configured to retrieve at least one of the plurality of media programs from the queue and to process the at least one of the plurality of media programs. The control logic is configured to monitor a utilization of the queue and to adjust the number of servers based upon the utilization of the queue.

In other embodiments, a method to process a plurality of media programs is provided. The method suitably comprises placing each of the plurality of media programs on a queue, retrieving the media programs from the queue with each of a number of servers, processing the retrieved media programs with each of the servers, monitoring a utilization of the queue, and adjusting the number of servers based upon the utilization of the queue.

Still other embodiments provide a system to distribute a plurality of media programs on a network. The system comprises a receiving server, a processing system and a host. The receiving server is configured to receive each of the media programs and to format each of the media programs using a pre-determined format. The processing system comprises a queue and a number of servers each compatible with the pre-determined format, wherein the queue is configured to receive each of the media programs in the pre-determined format from the receiving server, and wherein each of the plurality of servers is configured to retrieve at least one of the media programs from the queue and to transcode the media program. The host is configured to receive the transcoded media programs and to make the transcoded media programs available on the network.

Various other embodiments, aspects and other features are described in more detail below.

BRIEF DESCRIPTION OF THE DRAWING FIGURES

Exemplary embodiments will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Systems and methods are provided for automating the processing of media programming that is received from one or more sources. Received media programs are initially placed on a queue until a server is available to process the media program. A server retrieves the program from the queue, and provides any number of processing services to the received program. Services may include, for example, encode/transcode services, upload services, metadata formatting services, metadata upload services, and/or the like. The server therefore provides appropriate processing to make the program available for distribution from a network host or the like.

Various embodiments may adjust the number of servers available for processing by monitoring the number of programming jobs currently held by the queue. As the queue fills, additional servers may be requested from a cloud computing service or the like. Similarly, as the queue empties, servers may be released to conserve cost.

Various other embodiments may initially format received programming and any associated metadata into a pre-determined format prior to storage on the queue. The pre-determined format suitably allows processing by a service-oriented architecture (SOA) implemented on each server in which a media service bus (MSB) routes the received program obtained from the queue between any number of data processing services. To that end, some embodiments of the pre-determined format may include any sort of service request (e.g., an XML, SOAP or other message) that is compatible with the MSB architecture. This request may be provided with a decorator structure or the like that allows for information sharing between services on the MSB and/or that provides additional data about the programming and/or its metadata. Various other embodiments, enhancements and features are described in additional detail below.

Figure 1:
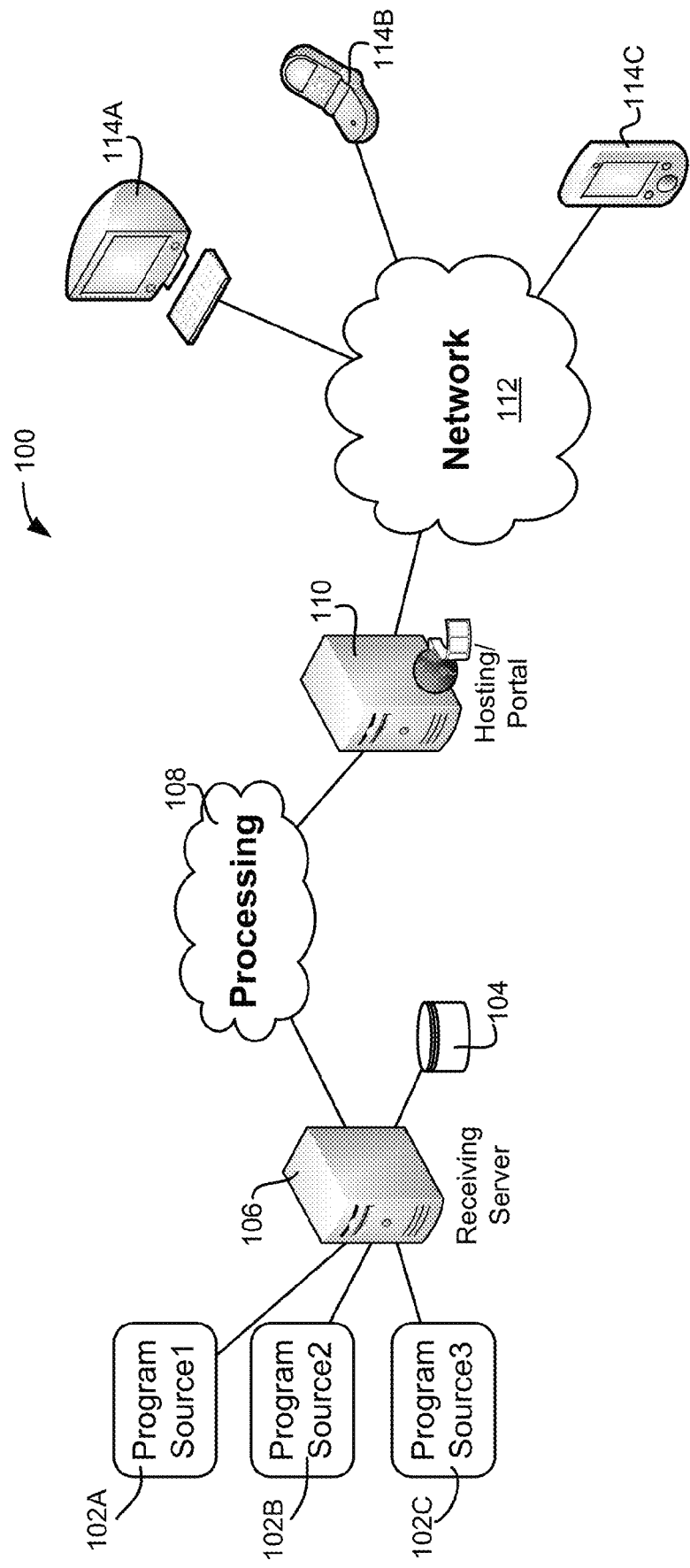
FIG. 1 is a block diagram of an exemplary system for receiving and distributing media programs over a network.

Turning now to the drawing figures, FIG. 1 shows one example of a system 100 that could be used to distribute media programs from any number of sources 102A-C. "Media program" refers to any audio, video, audio/visual or other programming in any streaming, file-based or other format. In various embodiments, system 100 distributes television, movie and/or other audiovisual programs in any digital format such as MPEG, Windows Media, Adobe Flash, Quicktime, Real Media, H.264 and/or the like. Such content may be provided to any number of viewers using any sort of media playback devices 114A-C. In various embodiments, media playback devices 114A-C could include desktop or notebook computers, mobile telephones, personal digital assistants, video game players, portable media players and/or any other devices capable of receiving media programs via a network 112 and of rendering audio and/or visual content to a viewer.

Network 112 is any digital or other communications network capable of transmitting data between senders (e.g., host 100) and receivers (e.g., client devices 114). In various embodiments, network 112 includes any number of public or private data connections, links and/or networks supporting any number of communications protocols. Network 112 may include the Internet, for example, or any other network based upon TCP/IP or other conventional protocols. In some implementations, network 112 may also represent a wireless and/or wired telephone network, such as a cellular communications network for communicating with mobile phones, personal digital assistants, and/or the like. Various embodiments of network 112 may also incorporate any sort of wireless or wired local area networks, such as one or more IEEE 802.3 and/or IEEE 802.11 networks, as well as any wider area links capable of inter-connecting such networks.

Network host 110 is any server or collection of servers capable of providing a front-end or other portal to system 100 that allows viewers to access media programs. In various embodiments, host 110 provides a conventional web-type server that provides program data to web browsers or other standard or proprietary client applications. Such data may be provided over network 112 using conventional TCP/IP, HTTP and/or other protocols as desired. Generally, host 110 will be implemented across any number of physical and logical server devices. For example, metadata and other visual content may be provided via a typical web portal residing at a well-known URL or other address, whereas streamed or other distributed content may be delivered from a separate server associated with a content delivery network or other provider. To receive a desired program, then, a user typically contacts network host 110 using a conventional browser or the like. The user then identifies the desired program by providing search criteria, navigating a user interface, and/or any other technique. In various embodiments, host 110 is able to search metadata associated with each program distributed to allow the user to search for programs based upon title, network, actor/actress names, genre and/or any other search criteria as desired. After the user has identified a desired program for viewing, host 110 may provide the program to a media player associated with one or more playback devices 114A-C. The program may be provided from host 110 itself, or from a server located at a content delivery network (CDN) or other backend location using any sort of streaming, file-based or other delivery techniques. Conventional web hosting and development techniques may therefore be applied in any manner to create a network host 110 that makes use of one or more server devices as appropriate.

Media programs may be received, formatted and made available on host 110 in any manner. In various embodiments, programming is received from any number of different content sources 102A-C at a receiving server 106. Content sources 102A-C may include studios or other content creators, syndicators or other content distributors, television networks, production houses, web or other network-based distributors, and/or any number of other sources 102 as desired. Program content may be delivered across any medium, including any sort of point-to-point or networked link. In various embodiments, the Internet or a similar network 112 may be used to receive programming from one or more sources 102A-C as well as to distribute processed programs to viewers.

Although FIG. 1 shows content being received at a separate receiving server 106, in practice content may be provided directly from sources 102A-C to processing system 108. Receiving server 106, when present, suitably receives programming from one or more sources 102A-C and provides the received content to processing system 108 in a suitable pre-determined format that allows further processing. In embodiments that do provide a receiving server 106, this server may be any conventional computing system capable of manually and/or automatically receiving program content via any transport technique, including any sort of pushed or pulled file transfer protocol (FTP), pushed or pulled trivial file transfer protocol (TFTP), hypertext transport protocol (HTTP), really simple syndication (RSS) or other automated syndication, and/or the like.

Metadata about the received content may be obtained from any source. In various embodiments, metadata is obtained from the content sources 102 with the delivered content itself. Alternatively, metadata may be obtained from any sort of database 104 that may or may not be associated with the provider of the programming itself. To that end, database 104 may be a web-based or other networked source of information (e.g., a database that can support queries across network 112). Alternately, database 104 may be a local database that is accessible to receiving server 106 and/or processing system 108, but that may not be otherwise available on network 112. Additional metadata about a particular program may be obtained from database 104 even when metadata is provided from the program source, particularly if the metadata provided from the source is incomplete, out-of-date, or in a less desirable format than metadata contained within database 104.

Received content and metadata may be processed in any manner. To that end, programming and/or metadata may be obtained from any number of programming sources, in any number of program formats, and using any number of transport techniques (e.g., FTP, TFTP, HTML, RSS and/or the like). In various embodiments, a common receiving server 106 transforms the received content (and its associated metadata, if appropriate) received in any manner from any number of different sources into a common format that is pre-determined and that is compatible with system 108.

The pre-determined format allows system 108 to process the received programming and/or its metadata without regard to the manner or format in which the content was received. To that end, the pre-determined format typically encompasses the received program data (or a pointer to the received data in other storage), as well as any associated metadata (or a pointer to the metadata) and/or any information about the program data and/or its metadata to enable system 108 to perform transcoding and/or other processing as appropriate. In various embodiments, transformation applications or other routines may be executed (e.g., at receiving server 106) to perform transport and format normalization so that the received data and/or metadata is placed into a format that is suitable for processing by system 108. In one embodiment, the pre-determined format provides a request for services in system 108 in the form of an XML, SOAP or similar message that includes (or references) the associated program content, metadata and/or other information as desired.

Again, in some embodiments receiving server 106 may be partially or wholly eliminated, and content providers 102A-C could simply provide some or all of their content in the appropriate format directly to system 108 for subsequent processing. Content providers 102 could provide programming and/or metadata in the pre-determined format, for example, and could provide the formatted content/metadata directly to system 108, thereby bypassing receiving server 106. Content could alternately be delivered in any proprietary, open or other agreed-upon structure to reduce the need for pre-processing by receiving server 106, as desired.

Received programming may be processed using any sort of processing system 108. Processing system 108 suitably performs transcoding, uploading, metadata processing and/or any other tasks to allow the received program to be distributed from host 110. To that end, processing system 108 suitably receives program data formatted according to the pre-determined job structure and processes each job as appropriate. Various embodiments of system 108 may be implemented using dedicated or shared hardware servers; other implementations may make use of virtual server features as part of a "cloud computing" service, such as any of the cloud computing services provided by AMAZON, GOOGLE, MICROSOFT, IBM, UBUNTU, SUN MICROSYSTEMS and/or any number of other providers. The Amazon Web Services (AWS) products and services available from Amazon.com, for example, could be used to implement some or all of processing system 108 in some embodiments, although other embodiments may use any other products or services as desired.

Program content and metadata are therefore received in any manner from any number of sources 112A-C, 114 and as desired. The received programs are appropriately transformed into in a pre-determined format to allow for transcoding and/or other processing. Each job is processed using system 108 to properly format or otherwise prepare the content for distribution from host 110 on network 112 to any number of clients 114A-C, as desired.

Figure 2:
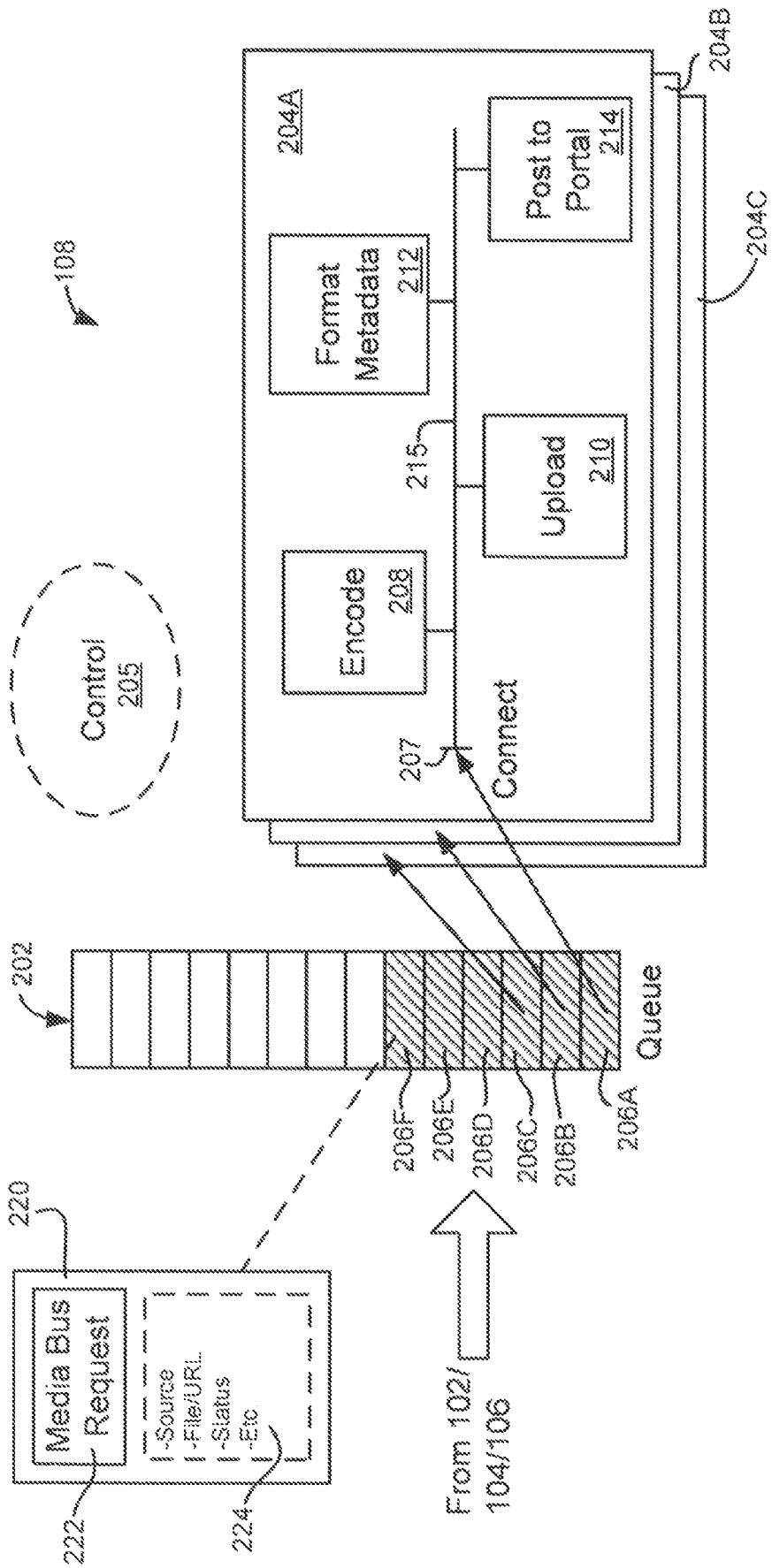
FIG. 2 is a block diagram of an exemplary system for processing media programming.

FIG. 2 is a block diagram of an exemplary processing system 108 that may be used in some embodiments. With reference now to FIG. 2, an exemplary processing system 108 suitably includes a project queue 202, one or more servers 204A-C, and any sort of appropriate control logic 205. Project queue 202 supports any number of active jobs 206A-E, each of which is associated with a received media program encapsulated within an appropriate job structure 220 or other suitable pre-determined format. Jobs 206A-E are appropriately received at queue 202 in the appropriate format (e.g., job structure 220) from receiving server 106 (FIG. 1), content sources 102A-C (FIG. 1) and/or any other sources. Each job 206 is assigned (e.g., by control logic 205 or the like) to a server 204 for processing of the media program. In various embodiments, the number of servers 204 in use at any particular time may dynamically depend upon the then-current utilization of queue 202, as described more fully below. Other embodiments, however, may simply process media program jobs 206 using a relatively static number of servers 204, as desired.

Queue 202 is any structure or service capable of maintaining jobs 206 in an orderly fashion. In various embodiments, queue 202 is a logical structure that is arranged for parallel processing, first-in-first-out (FIFO) processing, last-in-first-out (LIFO) processing, or any other processing scheme as desired. Job queue 202 may be implemented using, for example, the Amazon Simple Queue Service (SQS), although other embodiments may use any sort of queue, stack, array or other structure, or any service capable of providing queuing, messaging and/or the like. To that end, queue 202 may be physically provided on any sort of cloud service (e.g., SQS), or on any locally- or remotely-located hardware.

Each job 206A-E may be represented in queue 202 with any appropriate data structure or other format as desired. In the exemplary embodiment shown in FIG. 2, each job 206A-E is represented with a structure 220 that is formatted by receive receiving server 106 (FIG. 1), media source 102 (FIG. 1), and/or any source as appropriate. As noted above, structure 220 may be implemented using any sort of pre-determined format compatible with servers 204A-C, and with queue 202. In the embodiment shown in FIG. 2, structure 220 is shown as a decorator structure (e.g., a Java-type decorator) that includes a bus request 222 or other data that is compatible with servers 204A-C, as well as any associated data 224 about the particular job. Bus request 222 may be formatted as an XML, SOAP or similar request, for example, that can be parsed as appropriate by servers 204A-C. Structure 220 as shown in FIG. 2 also allows information 224 about each particular job 206 to be encapsulated within the structure 220 itself, thereby allowing each service operating within server 204 to independently process data associated with each job 204, as described more fully below.

Jobs 206 on queue 202 may be processed in any manner. In various embodiments, any number of actual or virtual servers 204A-C are provided for parallel processing of jobs 206 as needed. In the exemplary embodiment shown in FIG. 2, each server 204A-C is formed in accordance with an enterprise service bus (ESB) model that includes a media service bus 215 that provides messaging, routing, and/or other features as appropriate. Media service bus 215 may be implemented using, for example, the open source MULE enterprise service bus system, although other embodiments may use any other products or services other than MULE to implement equivalent functions. The ESB architecture allows jobs 206 to be routed between various services 208-214 that provide various types of processing to the job 206.

In the embodiment shown in FIG. 2, each server 204 includes a connector 207, which is any sort of program interface or the like that consumes jobs 206 from queue 202. In various embodiments, each server 204A-C processes jobs 206A-E from queue 202 in a sequential or other manner, with each server 204 processing the next job 206 that becomes available. Connector 207 includes programming (e.g., using MULE or similar constructs) for obtaining jobs 206 from queue 202 and initiating processing on server 204. Obtained jobs 206 may be routed along media service bus 215 using enterprise service bus routing techniques (e.g., using the MULE system), and/or other processing techniques as desired.

Processing of each job 206 may proceed in any manner. As jobs 206 are retrieved from the queue by a connector 207 associated with a particular server 204, the jobs will typically become unavailable to other servers 204. The exemplary server 204 shown in FIG. 2 includes a service 208 for encoding (or transcoding) content from any input format to any desired output format(s), a service 210 for uploading the encoded content to a content delivery network (CDN) or other host, a service 212 for formatting metadata associated with the content, and a service 214 for posting the formatted metadata to portal 110 so that viewers can search for and/or access the transcoded content. A job 206 that includes a media program received from the programming source in a particular format (e.g., MPEG-4), for example, may be encoded or transcoded at service 208 to a different format (e.g., Windows Media or H.264). The transcoded programming may then be uploaded to a CDN server using service 210. Program metadata associated with the received program may be formatted or otherwise manipulated as desired by service 212 prior to uploading to host 110 via service 214. After uploading of the program content and metadata, users may access the program by contacting host 110 via network 112, as appropriate.

Server 204 appropriately performs each task sequentially by routing the job 206 from service to service on the media service bus 215. Other embodiments may provide additional services (e.g., additional encoding services 208 to support different formats, bit rates and/or other parameters) to those shown in FIG. 2, and/or any number of other enhancements, modifications or substitutions may be provided across a wide array of equivalent embodiments. As noted above, jobs 206 may be routed between services 208-214 using MULE or other ESB routing constructs, or any other techniques as desired.

Each service 208-214 may be implemented in any format using any coding or scripting language. In various embodiments, each service 208-214 separately performs its processing of a job 206 without regard to the actions of other services. That is, each service 208-214 independently and sequentially performs its various functions on the particular job 206 as the job is routed from service to service on the media service bus 215. In such embodiments, each service 208-214 may provide status information (e.g., as information 224 in the decorator 220 associated with job 206) that can be accessed by other services. Each service, however, is typically isolated from the other services by the routing provided by media service bus 215, with information being shared through structure 220 as appropriate. For example, any number of jobs 206 may be routed between services 208-214 available on the media service bus 215 by MULE or another routing/messaging service. During processing by a service 208-214, the routing/messaging service may restrict processing by other services 208-214, thereby providing improved data integrity and reliability. This routing may be performed, for example, using MULE or any other enterprise service bus implementation that allows server 204 to be implemented using a service oriented architecture (SOA) or the like.

In some embodiments, different types of servers 204 may process different types of jobs 206, as desired. Some jobs 206 may need additional or reduced processing, for example (e.g., jobs 206 that are received in a displayable format from source 102 may not need particular transcoding features, or the like), and different servers 204 may be formulated to address the different needs of different types of jobs 206. In other embodiments, jobs 206 that do not need processing by all of the available services may simply be processed using server 204, with service bus 215 simply not directing the job 206 to services that are not needed. If transcoding is not needed for a particular job, for example (e.g., because content is already received in the desired display format), the job 206 may simply be routed from connector 207 to upload service 210 (or any other appropriate service) using the features of the media service bus 215. The routing may, in some embodiments, be altered according to attributes or other parameters of the particular job 206. These parameters may be determined from information 224 stored in MBR 222, in decorator 220, or in any other location. Some or all of services 208-214 may also add or change information 224 in decorator 220, as desired, to update the status of the job 206 or for any other purpose. Certain services 208-214 may be granted rights or privileges for altering or adding information 224 in some embodiments, or access control may be restricted in any other manner.

Control logic 205 represents any control features that may be available for managing system 108. In various embodiments, control logic 205 may be implemented with any monitoring, control or other software that is compatible with queue 202, servers 204 and/or any other features used within system 108. The RIGHTSCALE cloud management platform, for example, could be used alone or in conjunction with other programming in some embodiments to manage and control various aspects of system 108, although other embodiments may use other products or services as desired. Control logic 205 may be used in some embodiments to adjust the number of servers 204 that are available at any particular time.

To that end, various embodiments may provide any static or dynamic number of servers 204A-C. Each server 204 may process any number of jobs; in some embodiments, each server 204 simply consumes jobs 206 from queue 202 and processes the single job to completion before retrieving another job 206 from the queue 202. Jobs 206 are assigned from queue 202 to servers 204 based upon any appropriate criteria or scheme (e.g., FIFO, LIFO, priority assignment, etc.). In other embodiments, servers 204 may be able to multi-process more than one job 206 at a time.

In either case, some embodiments could allow the number of available servers 204A-C to be upwardly and/or downwardly adjusted as processing needs fluctuate over time. If the processing loads remain relatively constant, for example, a static number of actual or virtual servers 204 may be maintained. In various embodiments that make use of cloud computing systems or the like, however, it may be beneficial to adjust the number of servers 204 that are in use at any particular time. If processing loads are variable, for example, it may be beneficial to have sufficient server capability to process even peak loads in a relatively short period of time. A cloud computing provider may charge for services that are currently in use, however, thereby making excess capacity undesirably expensive during periods of time when the excess capacity is not needed. Hence, it may be beneficial in some embodiments to allow scaling of server resources so that adequate numbers of servers 204 are available during peak demand times, yet excess capacity is not consumed (and paid for) during times that the capacity is not needed.

Figure 3:
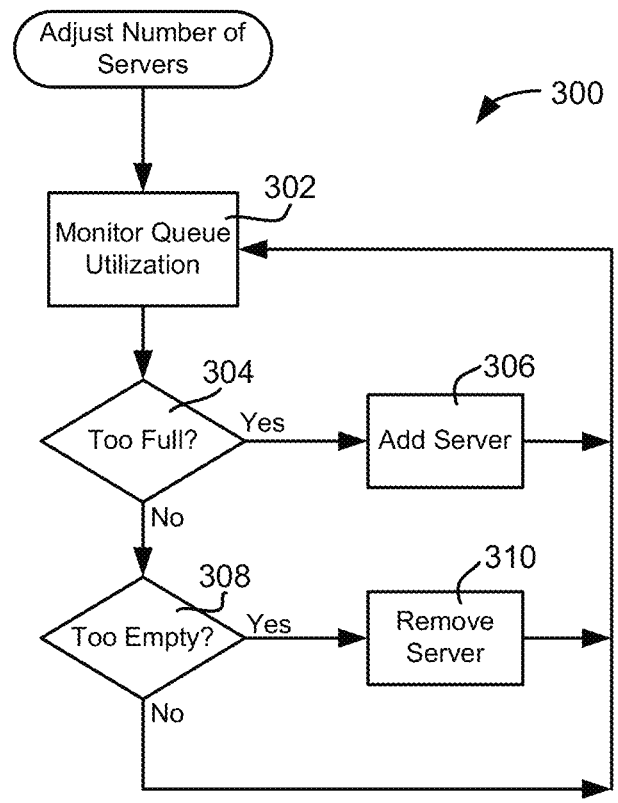
FIG. 3 is a flowchart of an exemplary technique for processing media programming.

FIG. 3 shows an exemplary process 300 for automatically scaling the server capacity that is available based upon the utilization of queue 202. In such embodiments, the utilization of queue 202 is monitored (function 302), with additional servers 204 added (function 306) if the queue is undesirably full (function 304). Conversely, servers may be removed from service (function 310) if the queue becomes underutilized (function 308). Process 300 may be executed using software logic (e.g., control logic 205) executing as part of system 108 in various embodiments.

The utilization or loading of queue 202 may be determined in any manner (function 302). In various embodiments, control logic 205 is able to determine the a metric of queue loading, such as the number of active jobs 206 in queue 202, as appropriate. The RIGHTSCALE products mentioned above, for example, may be used to determine metrics for scaling, including the size and utilization of an SQS or other queue 202. Other embodiments may determine queue fullness in any other manner (e.g., by monitoring respective rates that jobs are added or completed, by counting the number of jobs 206 as they are added and removed from queue 202, or though any other technique).

The loading of queue 202 may be determined to be "too full" (function 304) or "too empty" (function 308) according to any parameters or techniques. In various embodiments, the queue loading statistics obtained in function 302 are simply compared to appropriate threshold values, and the number of servers are adjusted as the loading passes a threshold value. As the number of jobs 206 on queue 202 passes an upper threshold, for example, an additional server 204 may be obtained from the "cloud" or another source. Similarly as the number of jobs 206 on queue 202 passes a lower threshold, one or more servers 204 may be released to conserve costs. Appropriate threshold values may be empirically determined, determined through trial-and-error, or determined by any other technique. In various embodiments, the threshold values may be adjusted upwardly or downwardly through the actions of an administrator.

The above discussion therefore presents a system 100 that is able to efficiently and effectively process content received from any number of sources 102A-C. Content is processed by system 108, which incorporates queuing 202 and any number of virtual or actual servers 204, each with a media service bus 215 that effectively routes processing jobs 206 between processing services 208, 210, 212, 214. In some embodiments, the number of servers 204 may be scaled upwardly and/or downwardly as desired to ensure adequate processing capabilities during periods of relatively high demand without undue costs of excess capability during periods of relatively low demand. The processed content may be distributed over a network 112 from a portal or other host 110 to any number of viewers operating any number of different client devices 114, as desired.

Accordingly, a distribution system 100 has been described that allows content to be received from multiple sources 102 in any format, using any transport mechanism, and having metadata in any format. This received content may be pre-processed, if needed, and then further processed by a system 108 to automate the encoding, transcoding and/or metadata formatting processes. That is, content can be formulated as a job 206 that can be placed on a queue 202 and retrieved for subsequent processing by one or more servers 204. Each server 204 may have a media service bus 215 or the like that is capable of routing the job 206 between services 208-214 as appropriate. The processed jobs 206 may then be delivered to a web host 110 in any manner so that viewers operating any sort of client devices 114 can retrieve the associated programming via network 112. Various additions, deletions or changes may be provided in any number of alternate but equivalent embodiments.

As used herein, the word "exemplary" means "serving as an example, instance, or illustration." Any implementation described herein as exemplary is not necessarily to be construed as preferred or advantageous over other implementations.

While the foregoing detailed description will provide those skilled in the art with a convenient road map for implementing various embodiments of the invention, it should be appreciated that the particular embodiments described above are only examples, and are not intended to limit the scope, applicability, or configuration of the invention in any way. To the contrary, various changes may be made in the function and arrangement of elements described without departing from the scope of the invention.

What is claimed is:

1. A computer system to process a plurality of media programs, the system comprising:
    a queue configured to receive each of the plurality of media programs in a non-transitory data storage medium, wherein each of the media programs is received in one of a plurality of initial formats;
    a number of servers each implemented with a cloud computing service, wherein each server is configured to retrieve at least one of the plurality of media programs from the queue and to convert the retrieved media program from its initial format into a common format that is suitable for distribution by a host; and
    control logic configured to monitor a utilization of the queue and to adjust the number of servers based upon the utilization of the queue by obtaining an additional server from the cloud computing service when the utilization of the queue passes a first threshold and by releasing one of the servers when the utilization of the queue passes a second threshold.

2. The computer system of claim 1 wherein each of the initial formats is a pre-determined format, and wherein each of the servers is configured to process the retrieved media programs using a plurality of services compatible with the pre-determined format.

3. The computer system of claim 2 wherein the at least one of the plurality of media programs is routed between the plurality of services using a media service bus.

4. The computer system of claim 3 wherein the pre-determined format comprises a media bus request compatible with the media service bus.

5. The computer system of claim 1 wherein each of the servers is configured to format metadata associated with the media program.

6. A method to process a plurality of media programs each received in one of a plurality of initial formats, the method comprising:
- placing each of the plurality of media programs on a queue;
- retrieving each of the plurality of media programs from the queue with a number of servers each implemented using a cloud computing service;
- processing each of the retrieved media programs with one of the servers to transform each media program from its initial format to a common format that is suitable for distribution by a host;
- monitoring a utilization of the queue during the processing; and
- adjusting the number of servers based upon the utilization of the queue so that additional servers are acquired from the cloud computing service when the number of media programs on the queue passes a first threshold and at least some of the servers are released when the number of media programs on the queue passes a second threshold.

7. The method of claim 6 wherein each of the initial formats is a pre-determined format, and wherein the processing comprises processing the media programs using a plurality of services compatible with the pre-determined format.

8. The method of claim 6 wherein the processing comprises transcoding the media program from the initial format to the common format and uploading the media program in the common format to the host, wherein the host is configured to distribute the media program in the common format on a network.

9. The method of claim 8 wherein the processing further comprises formatting metadata associated with the media program.

10. A system to distribute a plurality of media programs on a network, the system comprising:
- a receiving server configured to receive each of the media programs and to format each of the media programs using a pre-determined format;
- a processing system comprising a queue and a number of servers each implemented with a cloud computing service, wherein the queue is configured to receive each of the media programs in the pre-determined format from the receiving server, and wherein each of the number of servers is configured to retrieve at least one of the media programs from the queue and to transcode the media program from the pre-determined format to a common format suitable for distribution, wherein the number of servers is increased when a number of media programs in the queue passes a first threshold and decreased when the number of media programs in the queue passes a second threshold; and
- a host configured to receive the transcoded media program in the common format and to make the transcoded media program available on the network.

11. The system of claim 10 wherein the processing system comprises control logic configured to monitor a utilization of the queue.

12. The system of claim 10 wherein the receiving server is configured to receive the media programs from a plurality of sources and in a plurality of formats, and to format each of the media programs by transforming each of the media programs received in the plurality of formats into the pre-determined format.

13. The system of claim 12 wherein the receiving server is further configured to receive the media programs from the plurality of sources using a plurality of different transport techniques.

14. The system of claim 10 wherein the receiving server is configured to obtain metadata associated with each of the media programs and to incorporate the metadata into the pre-determined format associated with each of the media programs, wherein each of the number of servers is configured to format the metadata associated with the at least one of the media programs, and wherein the host is configured to receive the formatted metadata and to make the formatted metadata available on the network.

15. The system of claim 14 wherein the metadata is retrieved from a database.

* * * * *